United States Patent [19]

Weiss

[11] Patent Number: 5,036,144
[45] Date of Patent: Jul. 30, 1991

[54] POWDERED LACQUER OF EPOXY RESIN OF DIAMINE-BENZENE POLYCARBOXYLIC ACID SALT

[75] Inventor: Joern-Vollker Weiss, Haltern, Fed. Rep. of Germany

[73] Assignee: Huels Aktiengesellschaft, Marl, Fed. Rep. of Germany

[21] Appl. No.: 52,379

[22] Filed: May 21, 1987

[30] Foreign Application Priority Data

Jul. 17, 1986 [DE] Fed. Rep. of Germany ....... 3624078

[51] Int. Cl.$^5$ ..................... C08L 63/02; C08L 63/06; C08L 63/08
[52] U.S. Cl. .................................. 525/423; 525/533; 525/934
[58] Field of Search .................. 525/423, 533, 934

[56] References Cited

U.S. PATENT DOCUMENTS 3,947,384  3/1976  Schülde et al. .................... 528/114
4,240,938  12/1980  Kraft et al. ......................... 525/533

FOREIGN PATENT DOCUMENTS 57-61020  4/1982  Japan .

OTHER PUBLICATIONS

Detroit Society for Paint Technology, "Powder Coating: Why-How-When," Journal of Paint Technology, vol. 44, No. 565, Feb., 1972, pp. 30-37.

*Primary Examiner*—John C. Bleutge
*Assistant Examiner*—Robert E. L. Sellers, II
*Attorney, Agent, or Firm*—Oblon, Spivak, McClelland, Maier & Neustadt

[57] ABSTRACT

The invention relates to lacquers based on a substance mixture of epoxide compounds and possibly polyesters as well as salts of primary (cyclo)aliphatic $C_{4-18}$-diamines with benzene polycarboxylic acid as hardeners as well as the usual additives and a procedure for the production of flat lacquer coatings.

7 Claims, No Drawings

POWDERED LACQUER OF EPOXY RESIN OF DIAMINE-BENZENE POLYCARBOXYLIC ACID SALT

BACKGROUND OF THE INVENTION

1. Field of the Invention

The invention relates to powder lacquers based on a mixture of epoxide compounds salts of benzene polycarboxylic acids and optionally polyesters with primary diamines as hardeners.

2. Discussion of the Background

In industry there is a great need for powder lacquers of all types. This is primarily due to the fact that with their use no solvents are needed and there are only very small losses during application. Powder lacquers are economical and ecologically sound.

Most known lacquers produce glossy surfaces. In recent times, there has been more interest in flat surfaces. Also, it is often more advantageous to produce flat surface for safety reasons.

The simplest principle for obtaining a flat surface is to add to the powdered lacquer smaller or greater amounts of fillers, depending on the extent of the desired flat effect. Fillers such as chalk, finely distributed silicon oxide, barium sulfate or incompatible additives such as waxes, cellulose derivatives may be used. These additives have the effect of decreasing the technical quality of the lacquers however.

In DE-PS 23 24 696 a procedure for the production of lacquers with flat surface is disclosed in which a special hardener in the salt of cyclic amides with certain polycarboxylic acids is use. Actually, because of its excellent technical properties, this is the only procedure which has been economically successful. In the meantime, the procedure has been repeatedly improved (see DE-OS 30 26 455, OS 30 26 456 and German patent application P 35 11 998.5 of Apr. 2, 1985 "Hardener for powdery lacquers on the basis of epoxy resins").

However, in spite of this, this procedure has some basic disadvantages. The required amidines are expensive and not always available in the quantities needed. It would be desirable to be able to use more available basic compounds, such as directly available liquid diamines in a suitable form as a hardener for epoxy resins. However, the salts of these amines with the normally used carboxylic acids are, contrary to the amidine salts, so stable that under the baking conditions usual in the powder lacquer industry, there is no sufficient hardening of the epoxy resins.

In JP-OS 82/61 020, additive products of dodecamethylene diamine with an aliphatic dicarboxylic acid and carbon dioxide are disclosed which are supposed to effect the hardening of epoxy resins already at temperatures between 90° and 120° C. Tests have shown that under these conditions lacquers with satisfactory properties are not obtained. In particular there is no flat effect (see comparison tests). Thus, one would be discouraged from using this system for epoxy lacquers.

DE-OS 33 28 134 describes powder lacquers based on mixtures of epoxy compounds, polycarboxylic acids and reaction products of triacetone diamines with epoxides, urea and isocyanates, which produce flat lacquers after hardening. The triacetone diamine derivatives permit a hardening at temperatures of above 160° C. with acceptable processing times. A disadvantage of this system is that it is limited to certain triacetone diamine derivatives which must first be produced and isolated during a preliminary reaction.

SUMMARY OF THE INVENTION

Accordingly, one object of the present invention is to provide powdered lacquers which remain stable during storage.

Another object of the invention is to provide powdered lacquers having a hardener which is usable for epoxy resins as well as for so-called hybrid systems, i.e., mixed systems of epoxy and polyester resins.

Still another object of the invention is to provide powdered lacquers using hardeners which are easily obtained, easy to produce and available in large quantities.

A further object of the invention is to provide powdered lacquers which use a hardener that produces a flat surface.

These objects and other objects of the invention which will become apparent from the following specification have been achieved by the present powdered lacquers which contain (a) epoxy compounds which have on the average more than one epoxy group per molecule and a melting point above 70° C., (b) salts of benzene polycarboxylic acids with primary $C_{4-18}$ aliphatic or primary $C_{4-18}$ cycloaliphatic diamines, (c) 1,4-diazabicyclo[2.2.2]-octane, and optionally up to 45 weight percent polyester, relative to the weight of the epoxy compound, and a method for producing these powdered lacquers.

DETAILED DESCRIPTION OF THE PREFERRED EMBODIMENTS

The advantage of the powdered lacquers according to the invention is primarily that there is no need for reliance on special nitrogen-containing compounds and additives which must first be synthesized. Rather, absolutely common compounds can be used which are commercially available.

Suitable epoxy resins have, on the average, more than one epoxy group per molecule and have a melting point above 40° C. The epoxy resins may be saturated or unsaturated, aliphatic, cycloaliphatic, araliphatic or heterocyclic. Preferred epoxide resins are those made from the following types of epoxides:

(a) epoxides of multiply unsaturated hydrocarbons, such as vinyl cyclohexene, dicyclopentadiene, 1,3-cyclohexadiene and 1,4-cyclohexadiene, cyclododecadienes and cyclododecatrienes, isoprene, 1,5-hexadiene, butadiene, polybutadienes, divinylbenzenes, etc., (b) epoxy ethers of multivalent alcohols, such as ethylene glycols, propylene glycols and butylene glycols, glycerin, pentaerythritol, sorbitol, polyvinyl alcohols and thiodiglycol, (c) epoxy ethers of multivalent phenols, such as resorcinol, hydroquinone, bis-(4-hydroxyphenyl)methane, bis-(4-hydroxy-3,5-dichlorophenyl)-methane, 1,1-bis(4-hydroxyphenyl)-ethane, 2,2-bis-(4-hydroxyphenyl)-propane, 2,2-bis-(4-hydroxy-3-methylphenyl)propane, 2,2-bis-(4-hydroxy-3,5,5-trichlorophenyl)-propane, bis-(4-hydroxyphenyl)phenylmethane, bis-(4-hydroxyphenyl)-diphenylmethane, bis-(4-hydroxyphenyl)-cyclohexylmethane, 4,4'-dihydroxydiphenylmethane, 2,2'-dihydroxydiphenylmethane, and (d) nitrogen-containing epoxides, such as N,N-diglycidylaniline, N,N'-dimethyldiglycidyl-4,4'-diaminodiphenylmethane, and triglycidylisocyanurate.

Epoxides of bisphenol A with an epoxide equivalent of 500 to 2000 and a melting point of 70° to 140° C. have proven particularly suitable.

Suitable polyesters, which can be added in amounts up to 45% relative to the weight of the epoxy compounds, comprise oligoester of aliphatic and cycloaliphatic or aromatic polycarboxylic acids with aliphatic and cycloaliphatic diols, whereby both components have 4 to 18 carbon atoms.

The oligoesters can be produced from aliphatic, cycloaliphatic or aromatic dicarboxylic or polycarboxylic acids on the one hand, and aliphatic or cycloaliphatic diols on the other hand. The carboxylic acids and diols contain 4 to 18 carbon-atoms. In the case of the diols, the individual carbon atoms can optionally be replaced by oxygen atoms. The requirement for the replacement is that an oxygen atom is separated by at least 2 carbon atoms from a hydroxyl group and/or another oxygen atom in the chain.

Suitable dicarboxylic acids are, for example, succinic acid, glutaric acid, adipic acid, trimethyladipic acid, azelaic acid, sebacic acid, decane-dicarboxylic acid, dodecane-dicarboxylic acid, fumaric acid, maleic acid and isophthalic acid. Suitable polycarboxylic acids include 1,2,3-benzenetricarboxylic acid, 1,5-naphthalene-dicarboxylic acid, 4,4'-benzophenone-dicarboxylic acid, butane-tetracarboxylic acid, cyclopentanetetracarboxylic acid, pyromellitic acid, 1,2,3,4-benzene-tetracarboxylic acid, 1,2,3,5-benzene-tetracarboxylic acid and 3,4-dicarboxylic-1,2,3,4-tetrahydronaphthalene-1-succinic acid.

Suitable diols for use include 1,3-butanediol; 1,4-butanediol, 2,3-butanediol; 1,4-pentanediol; 2,2-dimethyl-1,3-propanediol; 1,6-hexanediol and 2,5-hexanediol as well as 1,12-dodecanediol.

The carboxyl group containing oligoesters have an acid number (AN) of 30 to 150. The softening points generally are in the range of 40° to 110° C.

The production of the oligoesters is known (Sorensen and Campbell "Preparative Methods of Polymer Chemistry", Interscience Publishers Inc., New York, 1961, p. 111-127). Generally, the production is carried out at temperatures up to 200° C by condensation in the melt. The course of the reaction can be followed by titration of the excess carboxyl groups, so that the end of the reaction can be easily determined.

Preferred benzene polycarboxylic acids contain 2 to 5, preferably 2 to 4 carboxyl groups, directly bound to the benzene ring. Especially preferred are phthalic acid, terephthalic acid (TPA), trimellitic acid (TMA) and pyromellitic acid (PMA).

The preferred primary diamines have an aliphatic or cycloaliphatic structure with 4 to 18 C-atoms. Particularly suitable are (i) derivatives of cyclohexylamine containing an additional aliphatically or cycloaliphatically bound amino group, particularly isophorone diamine (IPD) and 4,4'-diamino-3,3'-dimethyldicyclohexyl-methane (DDDM), and (ii) aliphatic diamines with the structure of hexamethylenediamine, which may be optionally substituted by several low molecular weight alkyl groups, particularly 1,6-diaminohexane (Dia-1,6) and 2,2,4 and/or 2,4,4-trimethylhexamethylenediamine (TMD).

The production of the salts is suitably done by reaction of the benzene polycarboxylic acids with the diamines noted above in an aqueous or aqueous alcoholic solution at a temperature of about 50° C. The amount of acid is regulated such that for one amino group there is at least one, preferably at most two acid groups.

The powdered lacquers according to the invention also contain 1,4-diazabicyclo-[2.2.2]-octane, preferably in a quantity of between 0.5 and 1%, relative to the total weight of the mixture.

In the production of the powdered lacquer agents, it is also possible to also use the usual additives, such as leveling agents, pigments, dyes, fillers, catalysts, thixotropic agents, and UV and oxidation stabilizers. The quantity of these additives, relative to the amount of binding agents, can vary within a wide range.

The production of the lacquer can be done in such a manner, e.g., that the individual components (epoxy resins, hardeners and optional additives) are ground, mixed and extruded at 90° to 110° C. After extrusion, the mixture is cooled and ground to a grain size of less than 100 microns.

The application on substrates to be coated is done according to known methods, e.g., by electrostatic spraying of the powder, whirl sintering or electrostatic whirl sintering. Subsequently, the applied lacquer material is hardened for 5 to 35 minutes at temperatures between 160° and 240° C., preferably for 10 to 20 minutes between 180° and 220° C.

All substrates which are stable at the cited hardening temperatures, e.g., metals, glasses, ceramics and plastics can be coated with the powdered lacquer according to the invention.

The lacquers produced with the help of the hardeners according to the invention, show an even structure and a flat finish. With the determination method according to Gardner (60°), gloss levels up to 12 can be attained. In an unexpected manner, other technical properties of the lacquer also remain at a high level.

The technical properties of the lacquer were determined by means of the following testing methods:
Cupping according to Erichsen in mm (DIN 53 156)
Ball impact test according to Gardner (ASTM D 2794)
Grid testing (DIN 53 151)
Gloss level according to Gardner at 60° (ASTM D 523)

Other features of the invention will become apparent in the course of the following descriptions of exemplary embodiments which are given for illustration of the invention and are not intended to be limiting thereof.

EXAMPLES

The production of 200 g hardener was performed in a 1-liter-three-necked flask with a mechanical stirrer, a condenser, a powder funnel and a heating mantle.

The water soluble polyamines (e.g. IPD, TMD) are added in 400 ml of fully deionized water, non-water-soluble amines (e.g. dodecamethylene diamine Dia-12)) in a mixture of 200 ml ethanol and 200 ml water. While stirring, the solid acids are added to the solution in batches through the powder funnel. Subsequently, the reaction mixture is stirred for three hours at 50° C.

The isolation of the salt product then occurs by the evaporation of the solvent by means of a rotatary evaporator and subsequent drying of the solid residue under vacuum at 100° C. for 5 hours.

Production of the powder lacquers

The salts used as hardeners are first ground into a very fine powder by means of a rotary high-speed mill. Subsequently, this powder is coarsely mixed in a premixer with the remaining powdery components of the lacquer (epoxy resin and optional polyester, titanium oxide, 1,4-diazobicyclo-[2.2.2]-octane, leveling agent in the form of a 10% masterbatch, etc.) and extruded in a Buss-cokneader at 100° C. The cooled extrudate is ground into a fine powder, whereby the coarse particles over 100 microns are separated by means of a sieve. The thus obtained powder is applied to steel plates in an electrostatic powder spraying device at a voltage of 60 KV and baked in a recirculating drying oven at temperatures between 180° and 220° C.

The following hardening salts were produced:

| No. | polyamine/polycarboxylic acid | molar ratio |
|---|---|---|
| 1 | IPD/TMA | 3:2 |
| 2 | IPD/Dia-12/TMA | 2:1:2.1 |
| 3 | IPD/Dia-12/TPA | 1:1:2 |
| 4 | IPD/Dia-6/TMA | 1:2:2 |
| 5 | IPD/Dia-6/TMA | 2:1:2 |
| 6 | TMD/PMA | 2:1 |
| 7 | TMD/Dia-12/PMA | 1:2:2 |
| 8 | TMD/Dia-6/PMA | 2:2:2 |
| 9 | TMD/TPA | 1:1 |
| 10 | TMP/IPD/PMA | 0.5:1.5:1 |
| 11 | DDDM/PMA | 2:1 |
| 12 | DDDM/TMA | 3:2 |
| 13 | TMD/IPD/TMA | 1:2:2.15 |
| 14 | TMD/IPD/TPA | 1:0.5:2 |
| | for comparison | |
| 15 | Dia-12/succinic acid | 1:1 |

For the production of powdered lacquers the following epoxy resins and OH group-containing polyesters were used:

| Epoxy resin 1 (EP 1) | |
|---|---|
| EP equivalent weight | 850–940 |
| EP value | 0.10–0.11 |
| softening range | 80–100° C. |
| Epoxy resin 2 (EP 2) | |
| EP equivalent weight | 730–840 |
| EP value | 0.12–0.13 |
| softening range | 94–106° C. |
| Polyester resin 1 (PE 1) | |
| acid number | 47–57 |
| glass transition temperature | 58° C. |

Epoxy resin 1 is a product of the company Shell AG, Hamburg, which can be commercially obtained under the name Epikote® 1004.

Epoxy resin 2 is a product of the company Dow Chemical Co., with the designation DER® 663U. Polyester resin 1 is a product of the company DSM RESINS, Zwolle, The Netherlands, with the designation URALAC®°2228.

TABLE 1

| Example | \multicolumn{7}{c}{Composition of Powdered Lacquers} |
|---|---|---|---|---|---|---|---|

| Example | 1–10 | 11 | 12,13 | 14–19 | A–C | D | E |
|---|---|---|---|---|---|---|---|
| hardener | 3 | 5 | 3 | 3 | 3 | 3 | 3 |
| resin EP 1 | 56 | 54 | 56 | — | 56.5 | 56.5 | 56.5 |
| resin EP 2 | — | — | — | 40.8 | — | — | — |
| resin PE 1 | — | — | — | 15.2 | — | — | — |
| TiO₂ | 40 | 40 | 40 | 40 | 40 | 40 | 40 |
| leveling agent | 0.5 | 0.5 | 0.5 | 0.5 | 0.5 | 0.5 | 0.5 |
| 1,4-diazobicyclo-[2.2.2]-octane | 0.5 | 0.5 | 0.5 | 0.5 | — | — | 0.5 |

The numbers in the tables give the quantitative share of each component. In examples 1–13 the corresponding hardener 1–13 is used in each case, then for example 14, hardener no. 1; example 15, hardener no. 10; example 16, hardener no. 8; example 17, hardener no. 13; example 18, hardener no. 9; example 19, hardener no. 14; example A, hardener no. 10; example B, hardener no. 10; examples C, D and E, hardener no. 15.

TABLE 2

Hardening Conditions and Mechanical Characteristics of Varnishes

| Example | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Hardener no. | 1 | 2 | 3 | 4 | 5 | 6 | 7 | 8 | 9 | 10 | 11 | 12 | 13 | 1 | 10 | 8 | 13 | 9 | 19 |
| Hardener conditions | | | | | | | | | | | | | | | | | | | |
| time (minutes) | 15 | 10 | 10 | 10 | 10 | 10 | 15 | 15 | 10 | 15 | 15 | 15 | 15 | 15 | 15 | 15 | 15 | 10 | 10 |
| temp. (°C.) | 200 | 200 | 200 | 200 | 200 | 200 | 200 | 200 | 200 | 200 | 200 | 200 | 200 | 200 | 200 | 200 | 200 | 200 | 200 |
| mechanical characteristics | | | | | | | | | | | | | | | | | | | |
| layer thickness | 55 | 70 | 55 | 70 | 80 | 55 | 60 | 60 | 60 | 50 | 60 | 60 | 55 | 60 | 55 | 55 | 65 | 50 | 55 |
| Dorn bending test | 4 | <2 | <2 | <2 | <2 | <2 | <2 | <2 | <2 | <2 | <2 | <2 | <2 | <2 | <2 | <2 | <2 | <2 | <2 |
| Erichsen cupping | 3.2 | 6.5 | 8.2 | 7.3 | 5.8 | 7.8 | 8.1 | 8.7 | 10.1 | 7.5 | 4.0 | 6.8 | 7.5 | 9.1 | 9.7 | 10.1 | 8.1 | 10.2 | 10.4 |
| Ball impact | | | | | | | | | | | | | | | | | | | |
| direct | >80 | >80 | >80 | >80 | >80 | 60 | 60 | >80 | >80 | 80 | 80 | >80 | >80 | >80 | >80 | >80 | >80 | >80 | >80 |
| reverse | 10 | 20 | >80 | 20 | 20 | <10 | <10 | >80 | >80 | <10 | <10 | 40 | 20 | 20 | 50 | 50 | 20 | >80 | >80 |
| Gloss 60° | 12 | 16 | 45 | 17 | 14 | 25 | 16 | 22 | 44 | 15 | 18 | 27 | 13 | 21 | 22 | 43 | 26 | 50 | 65 |

TABLE 3

Hardening Conditions and Mechanical Characteristics of the Lacquers

| Example | A | B | C | D | E |
|---|---|---|---|---|---|
| Hardener No. | 13 | 10 | 15 | 15 | 15 |
| hardening conditions | | | | | |
| time (minutes) | 20 | 30 | 10 | 30 | 30 |
| temperature (°C.) | 200 | 200 | 200 | 120 | 120 |
| mechanical characteristics | | | | | |
| thickness of lacquer (μm) | 50 | 55 | 65 | 55 | 60 |
| Dorn bending test | >32 | >32 | >2 | 25 | 6 |
| Erichsen cupping | 0.4 | 0.2 | 9.2 | 0.3 | 1.3 |
| ball impact | | | | | |
| direct | 20 | 20 | >80 | 10 | 40 |
| reverse | <10 | <10 | <10 | <10 | <10 |
| gloss 60° | 35 | 100 | 60 | 45 | 72 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A powdered lacquer which is storage stable and which, when applied to a surface and heated at a temperature ranging from 160°-240° C., provides a lacquer coating, comprising:
   (a) an epoxy compound comprising on the average more than one epoxy group per molecule and having a melting point above 70° C.;
   (b) a salt of a polycarboxylic acid which is a benzene polycarboxylic acid compound containing from 2-5 acid groups and a nitrogen-containing compound which is a primary $C_{4-18}$ aliphatic diamine or a $C_{4-18}$ cycloaliphatic diamine; and
   (c) 1,4-diazabicyclo-[2,2,2]-octane; prepared by mixing ingredients (a), (b) and (c) as dry materials.

2. The powdered lacquer of claim 1, wherein said epoxy compound is produced from epoxides selected from the group consisting of epoxides of multiply unsaturated hydrocarbons, epoxy ethers of multivalent alcohols, epoxy ethers of multivalent phenols, and nitrogen-containing epoxides.

3. The powdered lacquer of claim 1, wherein said benzene polycarboxylic acid is a member selected from the group consisting of phthalic acid, terephthalic acid, trimellitic acid and pyromellitic acid.

4. The powdered lacquer of claim 1, wherein said nitrogen-containing compound is a derivative of cyclohexylamine.

5. The powdered lacquer of claim 4, wherein said derivative of cyclohexylamine is a member selected from the group consisting of isophorone diamine and 4,4'-diamino-3,3'-dimethyldicyclohexyl-methane.

6. The powdered lacquer of claim 1, wherein said nitrogen-containing compound is hexamethylenediamine or an alkyl substituted hexamethylenediamine.

7. The powdered lacquer of claim 6, wherein said alkyl-substituted hexamethylenediamine is a member selected from the group consisting of 1,6-diaminohexane, 2,2,4-trimethylhexamethylenediamine, and 2,4,4-trimethylhexamethylenediamine.

* * * * *